(12) United States Patent
Anderson et al.

(10) Patent No.: US 7,632,333 B2
(45) Date of Patent: Dec. 15, 2009

(54) PROCESS FOR SEPARATING TI FROM A TI SLURRY

(75) Inventors: Richard P. Anderson, Clarendon Hills, IL (US); Armstrong Donn, St. Charles, IL (US); Lance Jacobsen, Minooka, IL (US)

(73) Assignee: Cristal US, Inc., Woodridge, IL (US)

( * ) Notice: Subject to any disclaimer, the term of this patent is extended or adjusted under 35 U.S.C. 154(b) by 246 days.

(21) Appl. No.: 10/526,918

(22) PCT Filed: Sep. 3, 2003

(86) PCT No.: PCT/US03/27785

§ 371 (c)(1),
(2), (4) Date: Nov. 14, 2005

(87) PCT Pub. No.: WO2004/022800

PCT Pub. Date: Mar. 18, 2004

(65) Prior Publication Data

US 2006/0123950 A1    Jun. 15, 2006

Related U.S. Application Data

(60) Provisional application No. 60/408,932, filed on Sep. 7, 2002, provisional application No. 60/408,925, filed on Sep. 7, 2002, provisional application No. 60/408,933, filed on Sep. 7, 2002.

(51) Int. Cl.
 *C22B 9/02* (2006.01)
 *B01D 37/00* (2006.01)
 *C22B 34/12* (2006.01)

(52) U.S. Cl. .............................. 75/408; 75/407; 75/620

(58) Field of Classification Search .................. 75/331, 75/343, 351, 363, 368, 392–709; 210/767, 210/769, 772, 773, 778, 794, 800, 768, 770, 210/774; 205/398
See application file for complete search history.

(56) References Cited

U.S. PATENT DOCUMENTS 1,771,928 A    7/1930    Jung (Continued)

FOREIGN PATENT DOCUMENTS

AU    587782    11/1985

(Continued)

OTHER PUBLICATIONS

Christian Alt, "Solid-Liquid Separation, Introduction" in Ullmann's Encyclopedia of Industrial Chemistry, Wiley-VCH Verlag GmbH and Co., Online Jun. 15, 2000.*

(Continued)

*Primary Examiner*—George Wyszomierski
*Assistant Examiner*—Mark L Shevin
(74) *Attorney, Agent, or Firm*—Dunlap Codding, P.C.

(57) ABSTRACT

A method of separating metal particulates from a slurry of original constituents of liquid metal and metal particulates and salt particulates is disclosed. The metal and salt particulates are concentrated by removing at least some of the liquid metal, and then, liquid metal or a liquid of the original salt constituent or a mixture thereof is passed through the particulates at a temperature greater than the melting point of the original salt constituent to further concentrate the metal particulates. The metal particulates are then separated from the remaining original constituents or a mixture of the salt constituent. Density differences between the liquid metal and salt are also used to facilitate separation.

24 Claims, 3 Drawing Sheets

U.S. PATENT DOCUMENTS

| | | | |
|---|---|---|---|
| 2,205,854 A | 6/1940 | Kroll | |
| 2,607,675 A | 8/1952 | Gross | |
| 2,647,826 A | 8/1953 | Jordan | |
| 2,816,828 A * | 12/1957 | Mansan et al. | 75/615 |
| 2,823,991 A | 2/1958 | Kamlet | |
| 2,827,371 A | 3/1958 | Quin | |
| 2,835,567 A * | 5/1958 | Burr | 75/395 |
| 2,846,303 A * | 8/1958 | Keller et al. | 75/419 |
| 2,846,304 A | 8/1958 | Keller et al. | |
| 2,882,143 A | 4/1959 | Schmidt | |
| 2,882,144 A | 4/1959 | Follows et al. | |
| 2,890,112 A * | 6/1959 | Winter, Jr | 75/619 |
| 2,895,823 A | 7/1959 | Lynskey | |
| 2,915,382 A | 12/1959 | Hellier et al. | |
| 2,941,867 A | 6/1960 | Maurer | |
| 2,944,888 A | 7/1960 | Quin | |
| 3,058,820 A | 10/1962 | Whitehurst | |
| 3,067,025 A | 12/1962 | Chisholm | |
| 3,085,871 A | 4/1963 | Griffiths | |
| 3,085,872 A | 4/1963 | Kenneth | |
| 3,113,017 A | 12/1963 | Homme | |
| 3,331,666 A | 7/1967 | Robinson et al. | |
| 3,519,258 A | 7/1970 | Ishizuka | |
| 3,535,109 A | 10/1970 | Ingersoll | |
| 3,650,681 A | 3/1972 | Sugahara et al. | |
| 3,825,415 A | 7/1974 | Johnston et al. | |
| 3,836,302 A | 9/1974 | Kaukeinen | |
| 3,847,596 A | 11/1974 | Holland et al. | |
| 3,867,515 A | 2/1975 | Bohl et al. | |
| 3,919,087 A | 11/1975 | Brumagim | |
| 3,927,993 A | 12/1975 | Griffin | |
| 3,943,751 A | 3/1976 | Akiyama et al. | |
| 3,966,460 A | 6/1976 | Spink | |
| 4,007,055 A | 2/1977 | Whittingham | |
| 4,009,007 A | 2/1977 | Fry | |
| 4,017,302 A | 4/1977 | Bates et al. | |
| 4,070,252 A | 1/1978 | Bonsack | |
| 4,128,421 A | 12/1978 | Marsh et al. | |
| 4,141,719 A | 2/1979 | Hakko | |
| 4,149,876 A | 4/1979 | Rerat | |
| 4,190,442 A | 2/1980 | Patel | |
| 4,331,477 A | 5/1982 | Kubo et al. | |
| 4,379,718 A * | 4/1983 | Grantham et al. | 75/412 |
| 4,401,467 A | 8/1983 | Jordan | |
| 4,402,741 A | 9/1983 | Pollet et al. | |
| 4,414,188 A | 11/1983 | Becker | |
| 4,423,004 A | 12/1983 | Ross | |
| 4,425,217 A | 1/1984 | Beer | |
| 4,432,813 A | 2/1984 | Williams | |
| 4,445,931 A | 5/1984 | Worthington | |
| 4,454,169 A | 6/1984 | Hinden et al. | |
| 4,518,426 A | 5/1985 | Murphy | |
| 4,519,837 A | 5/1985 | Down | |
| 4,521,281 A | 6/1985 | Kadija | |
| 4,555,268 A | 11/1985 | Getz | |
| 4,556,420 A | 12/1985 | Evans et al. | |
| 4,604,368 A | 8/1986 | Reeve | |
| 4,606,902 A | 8/1986 | Ritter | |
| RE32,260 E | 10/1986 | Fry | |
| 4,687,632 A | 8/1987 | Hurd | |
| 4,689,129 A | 8/1987 | Knudsen | |
| 4,725,312 A | 2/1988 | Seon et al. | |
| 4,828,008 A | 5/1989 | White et al. | |
| 4,830,665 A | 5/1989 | Winand | |
| 4,839,120 A | 6/1989 | Baba et al. | |
| 4,877,445 A | 10/1989 | Okudaira et al. | |
| 4,897,116 A | 1/1990 | Scheel | |
| 4,902,341 A | 2/1990 | Okudaira et al. | |
| 4,915,729 A | 4/1990 | Boswell et al. | |
| 4,923,577 A | 5/1990 | McLaughlin et al. | |
| 4,940,490 A | 7/1990 | Fife et al. | |
| 4,941,646 A | 7/1990 | Stelts et al. | |
| 4,985,069 A | 1/1991 | Traut | |
| 5,028,491 A | 7/1991 | Huang et al. | |
| 5,032,176 A * | 7/1991 | Kametani et al. | 75/416 |
| 5,055,280 A | 10/1991 | Nakatani et al. | |
| 5,064,463 A | 11/1991 | Ciomek | |
| 5,082,491 A | 1/1992 | Rerat | |
| 5,147,451 A | 9/1992 | Leland | |
| 5,149,497 A | 9/1992 | McKee et al. | |
| 5,160,428 A | 11/1992 | Kuri | |
| 5,164,346 A | 11/1992 | Giunchi et al. | |
| 5,167,271 A | 12/1992 | Lange et al. | |
| 5,176,741 A | 1/1993 | Bartlett et al. | |
| 5,176,810 A | 1/1993 | Volotinen et al. | |
| 5,211,741 A | 5/1993 | Fife | |
| 5,259,862 A * | 11/1993 | White et al. | 75/363 |
| 5,338,379 A | 8/1994 | Kelly | |
| 5,356,120 A | 10/1994 | König et al. | |
| 5,427,602 A * | 6/1995 | DeYoung et al. | 75/412 |
| 5,437,854 A | 8/1995 | Walker et al. | |
| 5,439,750 A | 8/1995 | Ravenhall et al. | |
| 5,448,447 A | 9/1995 | Chang | |
| 5,460,642 A | 10/1995 | Leland | |
| 5,498,446 A | 3/1996 | Axelbaum et al. | |
| 5,580,516 A | 12/1996 | Kumar | |
| H1642 H | 4/1997 | Ogden | |
| 5,637,816 A | 6/1997 | Schneibel | |
| 5,779,761 A | 7/1998 | Armstrong et al. | |
| 5,897,830 A | 4/1999 | Abkowitz et al. | |
| 5,914,440 A * | 6/1999 | Celik et al. | 75/407 |
| 5,948,495 A | 9/1999 | Stanish et al. | |
| 5,951,822 A | 9/1999 | Knapick et al. | |
| 5,954,856 A | 9/1999 | Pathare et al. | |
| 5,958,106 A * | 9/1999 | Armstrong et al. | 75/370 |
| 5,986,877 A | 11/1999 | Pathare et al. | |
| 5,993,512 A | 11/1999 | Pargeter et al. | |
| 6,010,661 A | 1/2000 | Abe et al. | |
| 6,027,585 A | 2/2000 | Patterson et al. | |
| 6,040,975 A | 3/2000 | Mimura | |
| 6,099,664 A | 8/2000 | Davies | |
| 6,103,651 A | 8/2000 | Leitzel | |
| 6,136,062 A | 10/2000 | Loffelholz et al. | |
| 6,180,258 B1 | 1/2001 | Klier | |
| 6,193,779 B1 | 2/2001 | Reichert et al. | |
| 6,210,461 B1 | 4/2001 | Elliott | |
| 6,238,456 B1 | 5/2001 | Wolf et al. | |
| 6,309,570 B1 | 10/2001 | Fellabaum | |
| 6,309,595 B1 | 10/2001 | Rosenberg et al. | |
| 6,409,797 B2 | 6/2002 | Armstrong et al. | |
| 6,432,161 B1 | 8/2002 | Oda et al. | |
| 6,488,073 B1 | 12/2002 | Blenkinsop et al. | |
| 6,502,623 B1 | 1/2003 | Schmitt | |
| 6,602,482 B2 | 8/2003 | Kohler et al. | |
| 6,689,187 B2 | 2/2004 | Oda | |
| 6,727,005 B2 | 4/2004 | Gimondo et al. | |
| 6,745,930 B2 | 6/2004 | Schmitt | |
| 6,824,585 B2 | 11/2004 | Joseph et al. | |
| 6,861,038 B2 | 3/2005 | Armstrong et al. | |
| 6,884,522 B2 | 4/2005 | Adams et al. | |
| 6,902,601 B2 | 6/2005 | Nie et al. | |
| 6,921,510 B2 | 7/2005 | Ott et al. | |
| 6,955,703 B2 | 10/2005 | Zhou et al. | |
| 7,041,150 B2 | 5/2006 | Armstrong et al. | |
| 7,351,272 B2 | 4/2008 | Armstrong et al. | |
| 7,410,610 B2 | 8/2008 | Woodfield et al. | |
| 7,435,282 B2 | 10/2008 | Armstrong et al. | |
| 7,445,658 B2 | 11/2008 | Armstrong et al. | |
| 7,501,007 B2 | 3/2009 | Anderson et al. | |
| 7,501,089 B2 | 3/2009 | Armstrong et al. | |
| 2002/0050185 A1 | 5/2002 | Oda | |
| 2002/0152844 A1 | 10/2002 | Armstrong et al. | |
| 2003/0061907 A1 | 4/2003 | Armstrong et al. | |
| 2003/0145682 A1 | 8/2003 | Anderson et al. | |

| | | | |
|---|---|---|---|
| 2004/0123700 A1 | 7/2004 | Zhou et al. | |
| 2005/0081682 A1 | 4/2005 | Armstrong et al. | |
| 2005/0150576 A1 | 7/2005 | Venigalla | |
| 2005/0225014 A1 | 10/2005 | Armstrong et al. | |
| 2005/0284824 A1 | 12/2005 | Anderson et al. | |
| 2006/0086435 A1 | 4/2006 | Anderson et al. | |
| 2006/0102255 A1 | 5/2006 | Woodfield et al. | |
| 2006/0107790 A1 | 5/2006 | Anderson et al. | |
| 2006/0123950 A1 | 6/2006 | Anderson et al. | |
| 2006/0150769 A1 | 7/2006 | Armstrong et al. | |
| 2006/0230878 A1 | 10/2006 | Anderson et al. | |
| 2007/0017319 A1 | 1/2007 | Jacobsen et al. | |
| 2007/0079908 A1 | 4/2007 | Jacobsen et al. | |
| 2007/0180951 A1 | 8/2007 | Armstrong et al. | |
| 2007/0180952 A1 | 8/2007 | Lanin et al. | |
| 2008/0031766 A1 | 2/2008 | Dariusz et al. | |
| 2008/0152533 A1 | 6/2008 | Ernst et al. | |
| 2008/0187455 A1 | 8/2008 | Armstrong et al. | |
| 2008/0199348 A1 | 8/2008 | Armstrong et al. | |

FOREIGN PATENT DOCUMENTS

| | | |
|---|---|---|
| AU | 2003263081 | 6/2004 |
| CA | 2196534 | 2/1996 |
| EP | 0298698 | 1/1989 |
| EP | 0299791 | 1/1989 |
| EP | 1441039 | 7/2004 |
| EP | 1657317 | 5/2006 |
| GB | 722184 | 1/1955 |
| GB | 778021 | 7/1957 |
| JP | 31007808 | 9/1956 |
| JP | 49042518 | 4/1974 |
| JP | 51010803 | 4/1976 |
| JP | 60255300 | 12/1985 |
| JP | 6112837 | 1/1986 |
| JP | 62065921 | 3/1987 |
| JP | 64047823 | 2/1989 |
| JP | 4116161 | 4/1992 |
| JP | 05078762 | 3/1993 |
| JP | 10502418 | 3/1998 |
| JP | 11090692 | 4/1999 |
| JP | 2001279345 | 10/2001 |
| NO | 90840 | 1/1958 |
| SU | 411962 | 1/1974 |
| WO | WO96/04407 | 2/1996 |
| WO | WO98/24575 | 6/1998 |
| WO | WO2004/022269 | 3/2004 |
| WO | WO2004/022797 | 3/2004 |
| WO | WO2004/022798 | 3/2004 |
| WO | WO2004/022799 | 3/2004 |
| WO | WO2004/022800 | 3/2004 |
| WO | WO2004/026511 | 4/2004 |
| WO | WO2004/028655 | 4/2004 |
| WO | WO2004/033736 | 4/2004 |
| WO | WO2004/033737 | 4/2004 |
| WO | WO2004/048622 | 10/2004 |
| WO | WO2005/019485 | 3/2005 |
| WO | WO2005/021807 | 3/2005 |
| WO | WO2005/023725 | 3/2005 |
| WO | WO2005/042792 | 5/2005 |
| WO | WO2007/044635 | 4/2007 |
| WO | WO2007/089400 | 8/2007 |
| WO | WO2008/013518 | 1/2008 |
| WO | WO2008/079115 | 7/2008 |

OTHER PUBLICATIONS

Kelto et al. "Titanium Powder Metallurgy—A Perspective"; Conference: Powder Metallurgy of Titanium Alloys, Las Vegas, Nevada, Feb. 1980, pp. 1-19.

Mahajan et al. "Microstructure Property Correlation in Cold Pressed and Sintered Elemental Ti-6A1-4V Powder Compacts"; Conference: Powder Metallurgy of Titanium Alloys, Las Vegas, Nevada, Feb. 1980, pp. 189-202.

DeKock et al. "Attempted Preparation of Ti-6-4 Alloy Powders from $TiCl_4$, Al, $VCl_4$, and Na"; Metallurgical Transactions B, vol. 18B, No. 1, Process Metallurgy, Sep. 1987, pp. 511-517.

Upadhyaya "Metal Powder Compaction", Powder Metallurgy Technology, Published by Cambridge International Science Publishing, 1997; pp. 42-67.

Moxson et al. "Production and Applications of Low Cost Titanium Powder Products"; The international Journal of Powder Metallurgy, vol. 34, No. 5, 1998, pp. 45-47.

Alt "Solid-Liquid Separation, Introduction"; Ulmann's Encyclopedia of Industrial Chemistry, © 2002 by Wiley-VCH Verlag GmbH & Co., Online Posting Date: Jun. 15, 2000, pp. 1-7.

Gerdemann et al. "Characterization of a Titanium Powder Produced Through a Novel Continuous Process"; Published by Metal Powder Industries Federation, 2000, pp. 12.41-12.52.

Moxson et al. "Innovations in Titanium Powder Processing"; Titanium Overview, JOM, May 2000, p. 24.

Gerdemann "Titanium Process Technologies"; Advanced Materials & Processes, Jul. 2001, pp. 41-43.

Lü et al. "Laser-Induced Materials and Processes for Rapid Prototyping" Published by Springer, 2001, pp. 153-154.

Lee et al. "Synthesis of Nano-Structured Titanium Carbide by Mg-Thermal Reduction"; Scripta Materialia, 2003, pp. 1513-1518.

Chandran et al. "$TiB_w$-Reinforced Ti Composites: Processing, Properties, Application Prospects, and Research Needs"; Ti-B Alloys and Composites Overview, JOM, May 2004, pp. 42-48.

Chandran et al. "Titanium-Boron Alloys and Composites: Processing, Properties, and Applications"; Ti-B Alloys and Composites Commentary, JOM, May 2004 pp. 32 and 41.

Hanusiak et al. "The Prospects for Hybrid Fiber-Reinforced Ti-TiB-Matrix Composites"; Ti-B Alloys and Composites Overview, JOM, May 2004, pp. 49-50.

Kumari et al. "High-Temperature Deformation Behavior of Ti-$TiB_w$ In-Situ Metal-Matrix Composites"; Ti-B Alloys and Composites Research Summary, JOM, May 2004, pp. 51-55.

Saito "The Automotive Application of Discontinuously Reinforced TiB-Ti Composites"; Ti-B Alloys and Composites Overview, JOM, May 2004, pp. 33-36.

Yolton "The Pre-Alloyed Powder Metallurgy of Titanium with Boron and Carbon Additions"; Ti-B Alloys and Composites Research Summary, JOM, May 2004, pp. 56-59.

Research Report; P/M Technology News, Crucible Research, Aug. 2005, vol. 1, Issue 2, 2 pages.

* cited by examiner

_US 7,632,333 B2_

PROCESS FOR SEPARATING TI FROM A TI SLURRY

RELATED APPLICATIONS

This application, pursuant to 37 C.F.R. 1.78(c), claims priority based on provisional application Ser. No. 60/408,932, filed Sep. 7, 2002, U.S. Provisional Application Ser. No. 60/408,925, filed Sep. 7, 2002 and U.S. Provisional Application Ser. No. 60/408,933, filed Sep. 7, 2002

BACKGROUND OF THE INVENTION

This invention relates to the separation of unwanted constituents from a slurry produced during operation of the Armstrong Process and method to produce a product as disclosed in U.S. Pat. Nos. 5,779,761, 5,958,106 and 6,409,797 patents, the disclosures of which are herein incorporated by reference. As indicated in the above-identified and incorporated patents, the continuous process there disclosed, produces, for instance, titanium or a titanium alloy by the reduction of titanium tetrachloride with excess sodium. The product stream that exits the reactor is a slurry of liquid metal, salt particles or powder and titanium metal or metal alloy as particulates or powder. It should be understood that this invention relates to any material which can be made according to the Armstrong Process. When the slurry produced by the Armstrong Process is filtered, a gel or gel-like material is formed of the metal powder or particulates, the salt powder or particulates and the excess liquid reducing metal. This slurry has to be treated to separate the unwanted constituents, such as excess liquid metal, salt particulates from the desired end product which is the metal particulates or powder.

SUMMARY OF THE INVENTION

In developing the Armstrong Process with respect to titanium and its alloys, it has been found that the method of producing the slurry above referenced is very rapid and separation of the product from the slurry is the most difficult aspect in engineering of the continuous process. The description will be in terms of the exothermic reduction of titanium tetrachloride with sodium to produce titanium particles, sodium chloride particles and excess sodium; however, this is not to be construed as a limitation of the invention but for convenience, only.

Accordingly, it is an object of the present invention to provide a method for separating metal powder or particulates from a slurry of liquid metal and metal powder or particulates and salt powder or particulates.

Yet another object of the present invention is to provide a method of separating metal particulates from a slurry of the type set forth in which one of the unwanted constituents is used to separate both constituents from the slurry.

A still further object of the present invention is to provide a method of separating metal particulates from a slurry of original constituents of liquid metal and metal particulates and salt particulates, comprising concentrating the metal and salt particulates by removing at least some of the liquid metal, passing the liquid metal or a liquid of the original salt constituent or a mixture thereof at a temperature greater than the melting point of the original salt constituent or mixture thereof through the concentrated metal and the particulates to further concentrate the metal particulates, and thereafter separating the metal particulates from the remaining original constituents or a mixture of the salt constituent.

A final object of the present invention is to provide a method of separating metal particulates from a slurry of original constituents of liquid metal and metal particulates and salt particulates, comprising introducing the slurry of original constituents into a vessel having a liquid salt therein wherein layers form due to density differences with the liquid metal being the lightest and the metal particulates being the heaviest increasing the concentration of the metal particulates toward the bottom of the vessel, removing liquid metal from the vessel, separating the concentrated metal particulates with some liquid salt from the vessel, filtering the salt from the metal particulates, and thereafter cooling and water washing the salt from the metal particulates.

Additional advantage, objects and novel feature of the invention will become apparent to those skilled in the art upon examination of the following and by practice of the invention.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
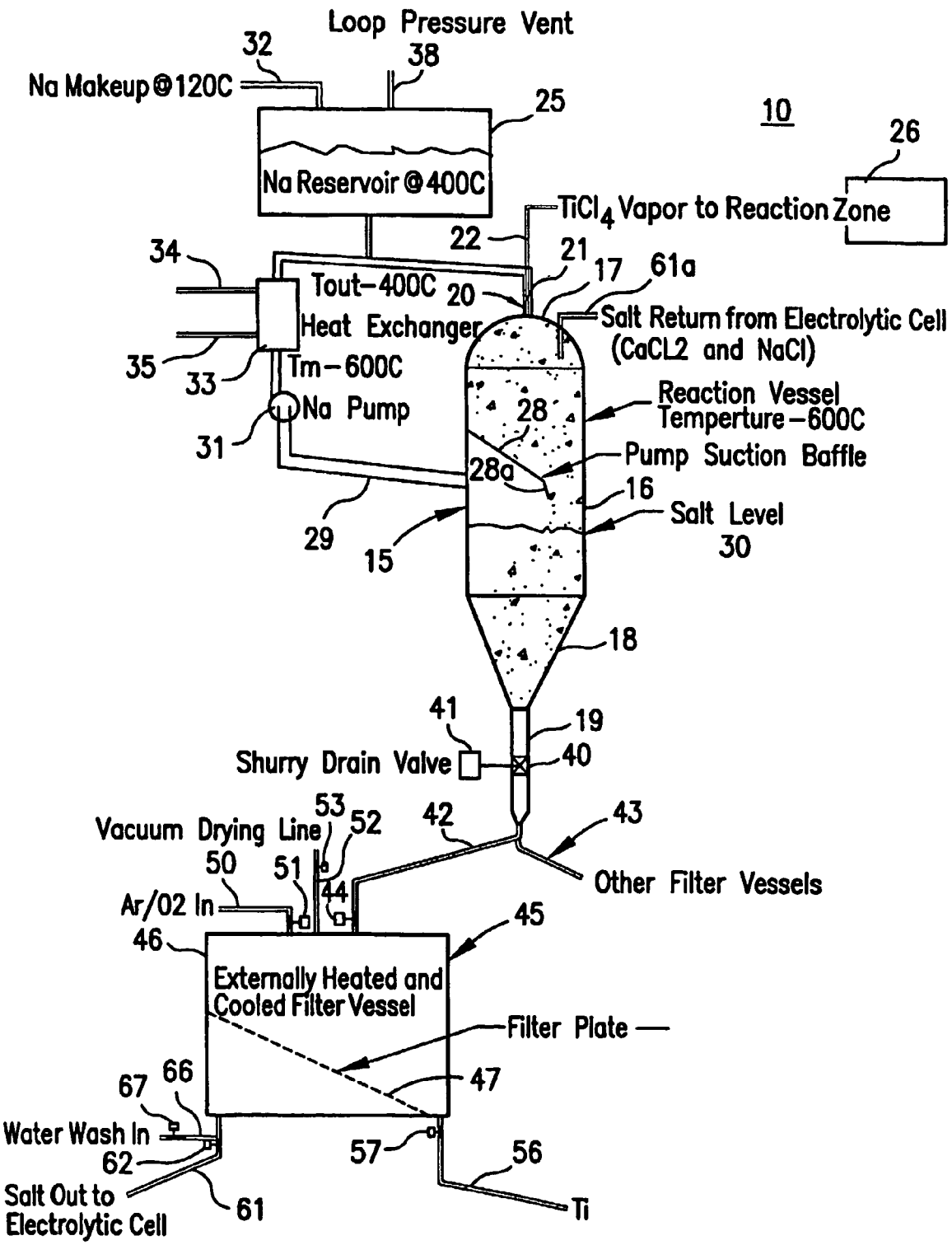
FIG. 1 is a schematic illustration of a first embodiment of the invention.

Referring now to the drawings and more particularly to FIG. 1, there is shown a separation system 10 in which a vessel 15 has a generally cylindrical portion 16 with a dome shaped top 17 and a frustoconical shaped bottom 18 and exit pipe 19 extending from the bottom of the vessel 15. A reactor 20 of the type disclosed in the above-referenced patents has a outer liquid metal or sodium tube 21 and an inner halide vapor or titanium tetrachloride tube 22. A liquid metal or sodium supply tank 25 feeds sodium to the sodium or other liquid metal to the reactor 20 and a halide boiler 26 feeds the appropriate halide vapor to the reactor 20, all as previously described.

Internally of the vessel 15 is a downwardly sloping baffle 28 having a distal end 28a extending at a more acute angle and generally opposite to a sodium or liquid metal outlet 29. The liquid metal outlet 29 is in fluid communication with a metal or sodium pump 31 which leads to a heat exchanger 33 having a fluid inlet 34 and a fluid outlet 35. A liquid metal make-up line 32 is in communication with the supply tank or reservoir 25. A vent line 38 is provided in the tank or reservoir 25, as is well known in the engineering art.

A valve 40 with an actuator 41 is positioned in the exit 19 of the vessel 15 which is in communication with two exit lines 42 and 43, each of which being provided with a valve such as a valve 44 illustrated in line 42.

A filter assembly 45 includes a container 46 and a sloping filtered plate 47 for a purpose hereinafter set forth. A passivating gas inlet 50 has a valve 51 intermediate the source of passivating gas (not shown) and the container 46. A vacuum drying line 52 exits the container 46 and is provided with a valve 53. A slurry outlet line 56 at the bottom of the container 46 is provided with a valve 57 and a salt outlet line 61 is provided with a valve 62. Finally, a water wash inlet pipe 66 is provided with a valve 67.

The separation system 10 operates in following manner wherein material such as a metal or metal alloy is produced in the reactor 20 by the method previously described in the aforementioned and incorporated Armstrong patents. By way of illustration only, titanium or a titanium alloy may be made by the reduction of titanium tetrachloride vapor or a plurality of halide vapors for an alloy by an alkali or alkaline earth metal such as sodium or magnesium. Alloys are easily made with the Armstrong Process by mixing the halide vapors in the appropriate quantities and reducing them in the exact same manner as hereinbefore described. In any event, using a large excess of the reducing metal to control the reaction produces a slurry of excess reducing metal, such as sodium, the metal particulates such as titanium and another reaction product such as salt particles, sodium chloride. The slurry leaving the reactor 20 may be at a variety of temperatures controlled, in one instance, by the amount of excess reducing metal present.

In an actual example, the slurry may typically have up to about 10% by weight particulates, and the particulates may be salt having diameters on average of from about 10 to about 50 microns and titanium having diameters on average in the range of from about 0.1 micron to about 500 microns, the titanium particulates or powder may be more likely to be in the range of from about 1-10 microns and the agglomerated ligaments (lumps) of the titanium in the range of between about 50 and about 1000 microns. This combination of liquid metal, salt particulates and titanium particulates leave the reactor 20 and enter the vessel 15. The salt in the vessel 15 is indicated to be at a level of which may be arbitrarily chosen so long as it is below the sodium outlet 29. The salt may be the reaction product salt, for instance sodium chloride, or a salt mixture which has a melting point lower than the reaction product salt. Although the salt may be as stated any salt, preferably the salt is the product of reaction or a mixture thereof, for instance an eutectic such as the calcium chloride-sodium chloride eutectic which melts at about 600° C.

The entire system 10 then may be operated at a lower temperature. For instance, sodium chloride melts at about 850° C. so if the salt in the vessel 15 is sodium chloride, then the vessel 15 must be operated above the melting point thereof, but as the eutectic melts at 600° C., this reduces the operating temperature. In any event, irrespective of what salt is present at the level 30 in the vessel 15, the liquid metal will float due to density differences and be extracted through the outlet 29 by means of the sodium or liquid metal pump 31. A heat exchanger 33 having suitable inlet and outlet lines 34, 35 serves to reduce the temperature of the sodium out from the 600° C. in the vessel 15 (by way of example only) so that the recycled sodium enters the reactor 20 at a preselected temperature (for instance about 400° C.). The baffle 28 and 28a prevents particulates entering the vessel 15 from the reactor 20 from being sucked into the sodium outlet 29.

As particulates settle in the lower portion 18 of the vessel 15, the particulate concentration is increased due to the removal of sodium through the line 29. Upon actuation of the valve 40, concentrated slurry will drain through the outlet or exit 19 through line 42 into the filter assembly 45. In the filter assembly 45, which is maintained by temperatures sufficient to keep the molten salt in a liquid phase, metal particles collect on the filter plate 47 while salt passing through the filter plate exits through line 61 to be returned, for instance, to an electrolytic cell (not shown). The valve 62 opens the line 61 to permit the salt to drain while valve 57 is closed to prevent material from exiting the filter assembly 45. After a sufficient filter cake has been built up, the valve 62 is closed, the valve 44 is closed and the vacuum drying line 53 is opened after the filter cake has cooled to less than about 100° C. so that the passivating gas which may be argon and a small percentage of oxygen may be introduced into the container 46 by actuation of the valve 51. After the filter cake which may be principally titanium powder with some salt is passivated, then the valve 51 is closed and the water wash valve 67 opened thereby allowing water to enter into the container 46 which both dissolves salt and moves the filter cake through line 56 to a finish wash and classification, it being understood that valve 67 will be opened prior to the water wash. The salt coming out of the filter assembly 45 through line 61 can be recirculated to the vessel 15 as indicated by the line 61.

As seen therefore, the separation system 10 depends on the difference in gravity between the unwanted liquid metal constituent of the slurry and the salt and metal particulates produced during the reaction of the dried vapor and the reducing metal. Although this separation system 10 is a batch system, it can be rapidly cycled from one filter assembly 45 to other filter assemblies as needed through a simple valve distribution system, as is well known in the art.

Although the above example was illustrated with sodium and titanium tetrachloride, it should be understood that any material made by the Armstrong Process may be separated in the aforesaid manner.

Figure 2:
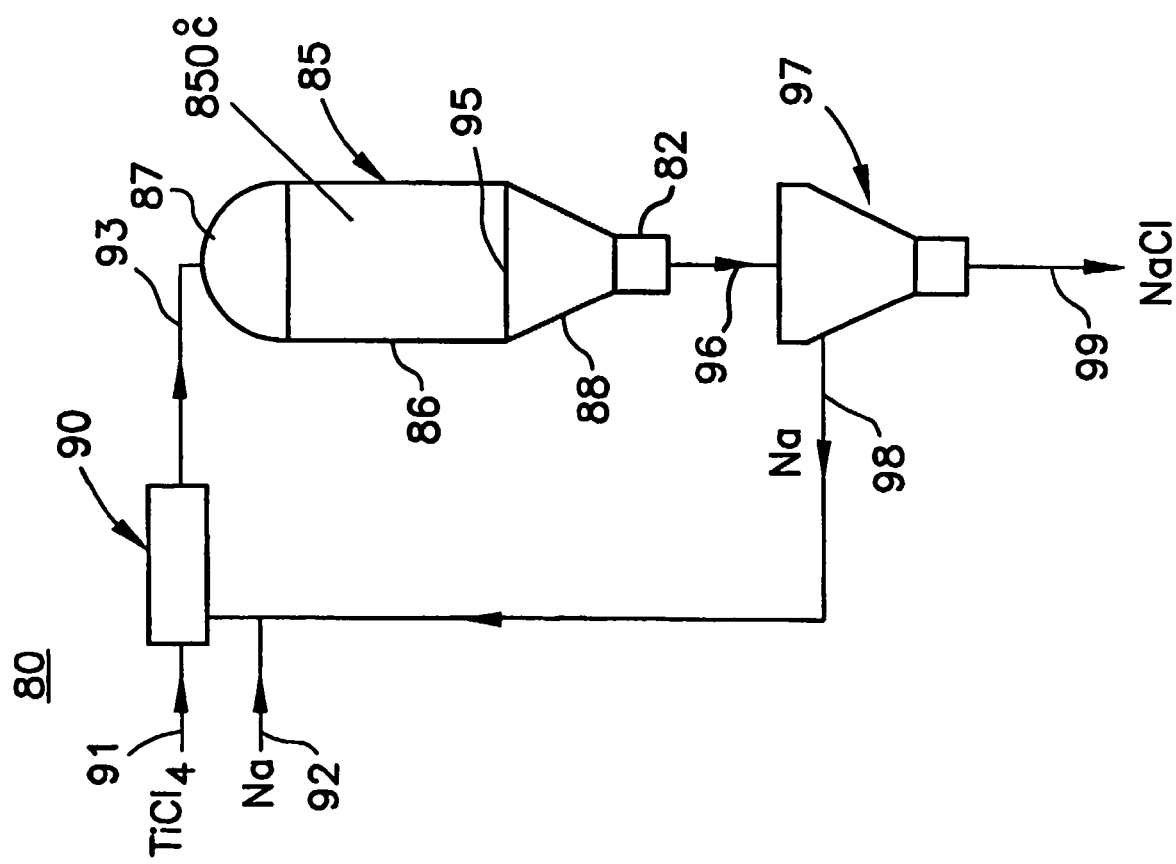
FIG. 2 is a schematic illustration of another embodiment of the present invention.

FIG. 2 shows an alternate embodiment separation system 80 in which a vessel 85 is similar to the vessel 15 and has a cylindrical portion 86, a dome top 87 and a frustoconical bottom 88 having an exit 88 extending therefrom. A reactor 90 of the same type as hereinbefore described is in communication with the vessel 85 and has a halide inlet 91 and a reducing metal inlet 92. A slurry outlet 93 which is in communication with the top 87 of the vessel 85. The filter 95 is any suitable filter, well known in the art, but preferably, for purposes of illustration only, is a "wedge screen filter" of a size to pass up to 125 micron particles. The material that flows through the filter 95 exits the vessel 85 through an output line 96 and flows into a gravity separator 97. The gravity separator 97 is frustoconical in shape and has an outlet 99 through which the heavier of the materials flows, in this particular case sodium chloride. An outlet 98 takes the lighter of the material, in this case sodium and recycles same through appropriate filters and other mechanisms, not shown, to the reactor 90. In this embodiment, the vessel 85 is maintained at an elevated temperature of about 850° C. with either internal or external heaters, as is well known in the art, in order that the salt in this case, sodium chloride, is liquid or molten. The molten sodium in large excess displaces the sodium chloride around the particulates and therefore the sodium and the salt flows through the filter plate 95 into the gravity separator 97 and is recycled as previously described. After a suitable filter cake is built up on the filter plate 95, the valves are closed and the filter cake is thereafter removed for further processing. The advantage of the embodiment disclosed herein is that one of the unwanted constituents, that is the sodium liquid metal is used to displace the other unwanted constituent which in this case is the molten salt. Suitable heat exchangers are required to reduce the temperature of the exiting sodium in line 98 before it is recycled and to heat and maintain the temperature of the salt in the molten state in both the vessel 85 and in the vessel 97.

Figure 3:
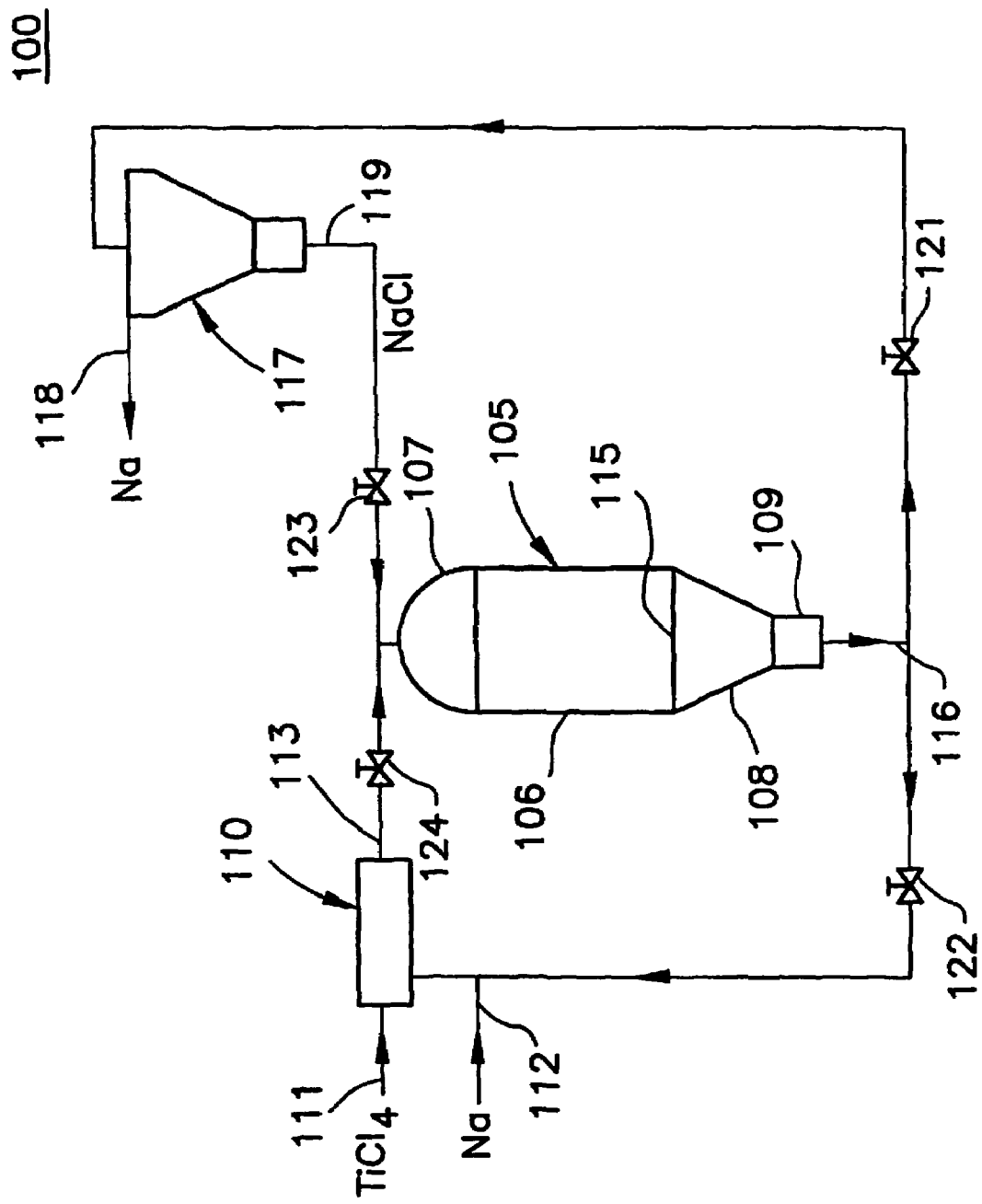
FIG. 3 is a schematic illustration of another embodiment of the present invention.

Referring now to FIG. 3, there is another embodiment of the present invention illustrated as the separation system 100. The separation system 100 is provided with similar equipment as illustrated in embodiments 10 and 80. In the system 100, there is a vessel 105 having a cylindrical portion 106, a dome shaped top portion 107 and a frustoconical shaped bottom portion 108 having an exit 109 at the bottom thereof. A reactor 110 of the type described in the previously described for practicing the Armstrong process has, as for example only, a titanium tetrachloride inlet 111 and a sodium inlet 112 which serves to produce the reaction previously described with the outlet 113 carrying the slurry produced from the reaction.

A gravity separator 117 is frustoconical in shape and has an outlet 118 for the lighter weight liquid metal such as sodium and a bottom outlet 119 through which the heavier unwanted constituent, in the present case sodium chloride, exits. Suitable valves are provided between the exit line 116 and the gravity separator 117 as indicated by the valve 121 and a valve 122 is in the exit line 116 between the vessel 105 and the sodium inlet 112. Another valve 123 is intermediate the vessel 105 and the sodium chloride outlet from the gravity separator 117 and finally a valve 124 is intermediate the reactor 110 and the vessel 105.

In the present system 100, the filter plate 115 collects the metal particulates as the salt which is molten and at a suitable temperature such as greater than the melting points, such as 850° C. for sodium chloride flows through the filter plate 115 carrying with it excess molten sodium which is displaced from the filter cake as it builds on the filter 115. The combination of liquid sodium and liquid salt flows out of the vessel 105. Closing valve 122 and opening the valve 121 results in the material being moved by a suitable pump (not shown) to the gravity separator 117. In the gravity separator 117, the liquid metal sodium floats and the liquid salt forms the heavier layer at the bottom of the separator 117 and is separated as indicated with the sodium being drawn off at the top of the separator through line 118 to be recycled (after cooling if required) to the sodium inlet to the reactor 110. The salt is recycled through valve 123 to the vessel 105. The reactor 110 can be isolated from the system by the valve 124 so that after a predetermined amount of time, the reactor can be disconnected from the system and shunted to a different separation module while liquid salt is used to displace liquid sodium present in the vessel 105 and in the titanium particulates forming the cake on the filter 115.

Although the separation systems disclosed herein are batch operations, the valving is such that continuous separations can occur while the reactor is running. A simple system of two or more of the separation systems 10, 80 or 100 permits a reactor continuously to produce the product of the Armstrong reaction.

Although described herein with reference to titanium and sodium, any alkali metal or alkaline earth metal or various combinations thereof may be used as the reductant metal. Any halide may be useful or any combinations of halides may be useful as the vapor which is injected into the liquid metal to cause the exothermic reaction to occur. For reasons of economics, sodium or magnesium are preferred with sodium being mostly preferred. For other reasons, titanium tetrachloride along with the chlorides of vanadium and aluminum are also preferred in order to make titanium powder or various titanium alloys, the titanium 6:4 alloy being the most preferred titanium alloy presently in use. The 6:4 titanium alloy is 6% aluminum and 4% vanadium with the remainder titanium, as is well known in the art.

While there has been disclosed what is considered to be the preferred embodiment of the present intention, it is understood that various changes in the details may be made without departing from the spirit, or sacrificing any of the advantages of the present invention.

We claim:

1. A method of separating metal particulates from a slurry consisting essentially of liquid reducing metal, metal particulates, and salt particles, comprising:
    concentrating the slurry by removing at least a portion of the liquid reducing metal to form a concentrated slurry; and
    passing at least one constituent selected from the group consisting of a liquid reducing metal or a liquid salt through the concentrated slurry to thereby further concentrate the metal particulates, wherein the at least one constituent removes the salt particulates and the liquid reducing metal in the concentrated slurry from the metal particulates.

2. The method of claim 1, wherein a gel is formed when at least a portion of the liquid reducing metal is removed.

3. The method of claim 1, wherein the liquid reducing metal is an alkali or an alkaline earth metal or mixtures thereof.

4. The method of claim 1, wherein the liquid salt is maintained at a temperature is maintained at a temperature below the sintering temperature of the metal particulates.

5. The method of claim 4, wherein the liquid salt is substantially an eutectic of $NaCl$ and $GaCl_2$.

6. The method of claim 1, wherein the metal particulates are Ti or a Ti alloy.

7. The method of claim 6, wherein the Ti alloy is 6% Al, 4% V and the remainder substantially Ti.

8. The method of claim 1, wherein the liquid reducing metal is sodium heated to a temperature greater than about 600° C.

9. The method of claim 8, wherein the sodium is heated to a temperature greater than about 800° C.

10. The method of claim 1, wherein the liquid salt is heated to a temperature greater than about 600° C.

11. The method of claim 1, wherein the metal particulates are Ti or a Ti alloy and the liquid reducing metal is Na and the salt particulates are NaCl.

12. The method of claim 11, wherein the metal particulates are a Ti alloy of 6% Al and 4% V and the remainder being substantially Ti.

13. A method of separating metal particulates from a slurry consisting essentially of liquid reducing metal, metal particulates, and salt particulates, comprising the steps of:
    introducing the slurry into a vessel having a liquid salt therein, the constituents of the slurry and of the liquid salt form layers due to density differences between the liquid reducing metal and the metal particulates, wherein the concentration of metal particulates is increased at the bottom of the vessel;
    removing the liquid reducing metal from the vessel;
    separating the concentrated metal particulates along with a portion of the liquid salt from the vessel;
    filtering the withdrawn portion of the liquid salt from the separated and concentrated metal particulates and,
    cooling and water washing the remaining salt from the separated and concentrated metal particulates.

14. The method of claim 13, wherein the liquid salt is substantially the same as the salt particulates.

15. The method of claim 13, wherein the liquid salt is a mixture of the salt particulates.

16. The method of claim 13, wherein the liquid salt is a eutectic of the salt particulates.

17. The method of claim 16, wherein the eutectic contains $NaCl_2$ and $CaCl_2$.

18. The method of claim 13, wherein the liquid salt is maintained at a temperature of less than about 800° C.

19. The method of claim 13, wherein the liquid salt is maintained at a temperature of about 600° C.

20. The method of claim 13, wherein the liquid reducing metal is an alkali or alkaline earth metal or mixtures or alloys thereof.

21. The method of claim 13, wherein the liquid reducing metal is Na or Mg.

22. The method of claim 1, wherein the liquid salt is prepared from liquid salt recycled after passing through the concentrated slurry.

23. The method of claim 4, wherein the liquid salt is substantially the same as the salt particulates.

24. The method of claim 13, wherein the liquid salt is prepared from liquid salt recycled after being filtered from the metal particulates.

* * * * *

UNITED STATES PATENT AND TRADEMARK OFFICE
CERTIFICATE OF CORRECTION

PATENT NO.         : 7,632,333 B2                                               Page 1 of 1
APPLICATION NO. : 10/526918
DATED              : December 15, 2009
INVENTOR(S)        : Anderson et al.

It is certified that error appears in the above-identified patent and that said Letters Patent is hereby corrected as shown below:

Column 6, line 31: Delete "$GaCl_2$" and replace with -- $CaCl_2$ --

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,632,333 B2 Page 1 of 1
APPLICATION NO. : 10/526918
DATED : December 15, 2009
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Twenty-first Day of December, 2010

David J. Kappos
*Director of the United States Patent and Trademark Office*